US012598500B2

(12) United States Patent     (10) Patent No.: US 12,598,500 B2

He et al.     (45) Date of Patent: Apr. 7, 2026

(54) METHODS, APPARATUSES, AND COMPUTER READABLE MEDIA FOR CONFIGURING MEASUREMENT GAP PATTERNS

(71) Applicant: NOKIA TECHNOLOGIES OY, Espoo (FI)

(72) Inventors: Jing He, Beijing (CN); Ping Yuan, Beijing (CN); Lei Du, Beijing (CN); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 232 days.

(21) Appl. No.: 18/552,538

(22) PCT Filed: Mar. 26, 2021

(86) PCT No.: PCT/CN2021/083297
§ 371 (c)(1),
(2) Date: Sep. 26, 2023

(87) PCT Pub. No.: WO2022/198641
PCT Pub. Date: Sep. 29, 2022

(65) Prior Publication Data
US 2024/0049035 A1     Feb. 8, 2024

(51) Int. Cl.
*H04W 24/10*     (2009.01)
(52) U.S. Cl.
CPC .................................. *H04W 24/10* (2013.01)
(58) Field of Classification Search
CPC ... H04W 24/10; H04W 36/0088; H04W 8/24; H04W 72/231; H04W 72/232;
(Continued)

(56) References Cited

U.S. PATENT DOCUMENTS 10,791,562 B2    9/2020    Ryoo et al.
2015/0245235 A1    8/2015    Tang et al.
(Continued)

FOREIGN PATENT DOCUMENTS

CN     111357357 A     6/2020
WO    2019/028850 A1    2/2019
(Continued)

OTHER PUBLICATIONS

"3rd Generation Partnership Project; Technical Specification Group Radio Access Network; NR; Requirements for support of radio resource management (Release 17)", 3GPP TS 38.133 v17.0.0, (Dec. 2020), 1812 pages.
(Continued)

*Primary Examiner* — Chuong A Ngo

(74) *Attorney, Agent, or Firm* — ALSTON & BIRD LLP

(57) ABSTRACT

Disclosed are methods for configuring measurement gap patterns. An example method may include: receiving configuration information associated with a plurality of pre-configured measurement gap patterns; receiving index information for configuring at least one measurement gap pattern of a bandwidth part; and configuring the at least one measurement gap pattern of the bandwidth part based on at least one of the configuration information and the index information. Related apparatuses and computer readable media are also disclosed.

21 Claims, 7 Drawing Sheets

(58) Field of Classification Search
CPC .............. H04W 24/08; H04W 72/0457; H04L
5/0053; H04L 5/0094; H04L 5/001; H04L
5/0098
See application file for complete search history.

(56) References Cited

U.S. PATENT DOCUMENTS

| | | |
|---|---|---|
| 2019/0075585 A1 | 3/2019 | Deogun et al. |
| 2019/0132862 A1 | 5/2019 | Jeon et al. |
| 2019/0182000 A1 | 6/2019 | Futaki |
| 2020/0288337 A1* | 9/2020 | Callender ............. H04W 24/10 |
| 2020/0374723 A1 | 11/2020 | Zheng |
| 2022/0104059 A1 | 3/2022 | Hu et al. |
| 2024/0049035 A1* | 2/2024 | He .......................... H04L 5/001 |
| 2024/0098540 A1* | 3/2024 | Kazmi .................. H04L 5/0048 |

FOREIGN PATENT DOCUMENTS

| | | | |
|---|---|---|---|
| WO | 2019/068926 A1 | 4/2019 | |
| WO | WO 2020/086514 A1 | 4/2020 | |
| WO | 2020/091660 A1 | 5/2020 | |
| WO | 2020/167198 A1 | 8/2020 | |
| WO | WO 2020/248261 A1 | 12/2020 | |

OTHER PUBLICATIONS

Abinader et al., "Impact of Bandwidth Part (BWP) Switching on 5G NR System Performance", 2019 IEEE 2nd 5G World Forum (5GWF), (Nov. 28, 2019), 6 pages.
Apple, "Consideration on preconfigured measurement gap patterns", 3GPP TSG-RAN4 Meeting #98-e, R4-2100221, (Jan. 25-Feb. 5, 2021), 5 pages.
CMCC, "Discussion on pre-configured MG pattern(s)", 3GPP TSG-RAN WG4 Meeting #98-e, R4-2100871, (Jan. 25-Feb. 5, 2021), 2 pages.
Ericsson, "Configuration of measurement gap in NR", 3GPP TSG-RAN WG2 #100, R2-1713737, (Nov. 27-Dec. 1, 2017), 3 pages.
Examination Report for Australian Application No. 2021436488 dated Sep. 16, 2024, 6 pages.
Intel Corporation, "New WI Proposal: NR measurement gap enhancements", 3GPP TSG RAN Meeting #89e, RP-202119, (Sep. 14-18, 2020), 5 pages.
Intel., "WF on R17 NR MG enhancements—Pre-configured MG patterns and NCSG", 3GPP TSG-RAN WG4 #98-e Meeting, R4-2103677, (Jan. 25-Feb. 5, 2021), 18 pages.
International Search Report and Written Opinion for Patent Cooperation Treaty Application No. PCT/CN2021/083297 dated Dec. 30, 2021, 9 pages.
Office Action for Japanese Application No. 2023-558954 dated Sep. 10, 2024, 6 pages.
Office Action for Vietnamese Application No. 1-2023-07472 dated May 8, 2024, 4 pages.
Decision to Grant for Japanese Application No. 2023-558954 dated Mar. 3, 2025, 4 pages.
Office Action for Chilean Application No. 202302845 dated Jan. 22, 2025, 18 pages.
Extended European Search Report for European Application No. 21932264.1 dated Oct. 28, 2024, 12 pages.
Moderator (Intel Corporation), "Email discussion summary for [98e][234] NR_MG_Part 2", 3GPP TSG-RAN WG4 Meeting #98-e, R4-2103473, (Jan. 25-Feb. 5, 2021), 75 pages.
Office Action for Saudi Arabian Application No. 523450833 dated Oct. 27, 2024, 13 pages.
Office Action for ARIPO Application No. AP/P/2023/015200 dated Jun. 17, 2025, 4 pages.
Decision to Grant for ARIPO Application No. AP/P/2023/015200 dated Oct. 1, 2025, 56 pages.
Office Action for Colombian Application No. NC2023/0014359 dated Jan. 5, 2026, 26 pages.

* cited by examiner

1300

1301

Transmitting configuration information associated with a plurality of pre-configured MGPs

1302

Transmitting index information for configuring at least one MGP of a BWP

1400

1401

Processor

1402

Memory

Code

1403

1500

1501

Processor

1502

Memory

Code

1503

METHODS, APPARATUSES, AND COMPUTER READABLE MEDIA FOR CONFIGURING MEASUREMENT GAP PATTERNS

CROSS-REFERENCE TO RELATED APPLICATIONS

This application is a national phase entry of International Application No. PCT/CN2021/083297, filed Mar. 26, 2021, the contents of which are hereby incorporated by reference in their entirety.

TECHNICAL FIELD

Various embodiments relate to methods, apparatuses, and computer readable media for configuring measurement gap patterns.

BACKGROUND

In a telecommunication system such as a long-term evolution (LTE) system and a new radio (NR or 5G) system, a measurement gap (MG) may be configured for a gap assisted measurement of a mobile station or user equipment (UE), during which no data transmission and reception between the UE and its current serving cell will occur and the UE may measure its received cell power (or signal quality) of a target cell. A measurement gap pattern (MGP) may be configured to provide the UE with one or more parameters such as a measurement gap length (MGL), measurement gap repetition period (MGRP), gap offset, measurement gap timing advance (MGTA), and so on.

SUMMARY

In a first aspect, disclosed is a method including: receiving configuration information associated with a plurality of pre-configured measurement gap patterns; receiving index information for configuring at least one measurement gap pattern of a bandwidth part; and configuring the at least one measurement gap pattern of the bandwidth part based on at least one of the configuration information and the index information. For example, the plurality of pre-configured measurement gap patterns may be associated with a plurality of bandwidth parts (for example, the whole of the plurality of bandwidth parts).

In some example embodiments, the configuration information may include a plurality of information items corresponding to the plurality of pre-configured measurement gap patterns, where an information item of the plurality of information items may include at least one of an index and a parameter configuration associated with a corresponding pre-configured measurement gap pattern.

In some example embodiments, the index of the corresponding pre-configured measurement gap pattern may be a predetermined identifier or may depend on an order of the corresponding pre-configured measurement gap pattern in the plurality of pre-configured measurement gap patterns.

In some example embodiments, the index information may include at least one index value for the at least one measurement gap pattern to be applied to the bandwidth part.

In some example embodiments, the configuration information may include a plurality of information items for a measurement gap pattern parameter among a plurality of measurement gap pattern parameters associated with the plurality of measurement gap patterns, where an information item of the plurality of information items for the measurement gap pattern parameter may include a value of the measurement gap pattern parameter and an index corresponding to the value of the measurement gap pattern parameter.

In some example embodiments, the index information may include at least one index value associated with at least one measurement gap pattern parameter among the plurality of measurement gap pattern parameters.

In some example embodiments, two or more indexes in the configuration information may share a predetermined identifier. For example, two or more indexes in the configuration information may correspond to a substantially same predetermined identifier.

In some example embodiments, the configuration information may include an indication of at least one default pre-configured measurement gap pattern.

In some example embodiments, the index information may include at least one of: information for indicating to apply the at least one default pre-configured measurement gap pattern or at least one previous measurement gap pattern to the bandwidth part; and information for indicating whether to apply the at least one default pre-configured measurement gap pattern to the bandwidth part.

In some example embodiments, the index information may include at least one predetermined index or at least one empty index for indicating to deactivate at least one activated measurement gap pattern of the bandwidth part.

In some example embodiments, the configuration information may be received via at least one first downlink radio resource control signaling.

In some example embodiments, the index information may be received via downlink control information or at least one second downlink radio resource control signaling.

In some example embodiments, the index information may be received via downlink control information or at least one second downlink radio resource control signaling for a bandwidth part switch, and a delay of completing the bandwidth part switch may include both a pre-defined bandwidth part switch time and a measurement gap pattern application time.

In some example embodiments, another configuration information associated with another plurality of pre-configured measurement gap patterns may be received, and the configuration information may be updated based on the another configuration information.

In a second aspect, disclosed is an apparatus which may be configured to perform at least the method in the first aspect. The apparatus may include at least one processor and at least one memory. The at least one memory may include computer program code, and the at least one memory and the computer program code may be configured to, with the at least one processor, cause the apparatus to perform: receiving configuration information associated with a plurality of pre-configured measurement gap patterns; receiving index information for configuring at least one measurement gap pattern of a bandwidth part; and configuring the at least one measurement gap pattern of the bandwidth part based on at least one of the configuration information and the index information. For example, the plurality of pre-configured measurement gap patterns may be associated with a plurality of bandwidth parts (for example, the whole of the plurality of bandwidth parts).

In some example embodiments, the configuration information may include a plurality of information items corresponding to the plurality of pre-configured measurement gap patterns, where an information item of the plurality of information items may include at least one of an index and a parameter configuration associated with a corresponding pre-configured measurement gap pattern.

In some example embodiments, the index of the corresponding pre-configured measurement gap pattern may be a predetermined identifier or may depend on an order of the corresponding pre-configured measurement gap pattern in the plurality of pre-configured measurement gap patterns.

In some example embodiments, the index information may include at least one index value for the at least one measurement gap pattern to be applied to the bandwidth part.

In some example embodiments, the configuration information may include a plurality of information items for a measurement gap pattern parameter among a plurality of measurement gap pattern parameters associated with the plurality of measurement gap patterns, where an information item of the plurality of information items for the measurement gap pattern parameter may include a value of the measurement gap pattern parameter and an index corresponding to the value of the measurement gap pattern parameter.

In some example embodiments, the index information may include at least one index value associated with at least one measurement gap pattern parameter among the plurality of measurement gap pattern parameters.

In some example embodiments, two or more indexes in the configuration information may share a predetermined identifier. For example, two or more indexes in the configuration information may correspond to a substantially same predetermined identifier.

In some example embodiments, the configuration information may include an indication of at least one default pre-configured measurement gap pattern.

In some example embodiments, the index information may include at least one of: information for indicating to apply the at least one default pre-configured measurement gap pattern or at least one previous measurement gap pattern to the bandwidth part; information for indicating whether to apply the at least one default pre-configured measurement gap pattern to the bandwidth part.

In some example embodiments, the index information may include at least one predetermined index or at least one empty index for indicating to deactivate at least one activated measurement gap pattern of the bandwidth part.

In some example embodiments, the configuration information may be received via at least one first downlink radio resource control signaling.

In some example embodiments, the index information may be received via downlink control information or at least one second downlink radio resource control signaling.

In some example embodiments, the index information may be received via downlink control information or at least one second downlink radio resource control signaling for a bandwidth part switch, and a delay of completing the bandwidth part switch may include both a pre-defined bandwidth part switch time and a measurement gap pattern application time.

In some example embodiments, another configuration information associated with another plurality of pre-configured measurement gap patterns may be received, and the configuration information may be updated based on the another configuration information.

In a third aspect, disclosed is an apparatus which may be configured to perform at least the method in the first aspect. The apparatus may include: means for receiving configuration information associated with a plurality of pre-configured measurement gap patterns; means for receiving index information for configuring at least one measurement gap pattern of a bandwidth part; and means for configuring the at least one measurement gap pattern of the bandwidth part based on at least one of the configuration information and the index information. For example, the plurality of pre-configured measurement gap patterns may be associated with a plurality of bandwidth parts (for example, the whole of the plurality of bandwidth parts).

In some example embodiments, the configuration information may include a plurality of information items corresponding to the plurality of pre-configured measurement gap patterns, where an information item of the plurality of information items may include at least one of an index and a parameter configuration associated with a corresponding pre-configured measurement gap pattern.

In some example embodiments, the index of the corresponding pre-configured measurement gap pattern may be a predetermined identifier or may depend on an order of the corresponding pre-configured measurement gap pattern in the plurality of pre-configured measurement gap patterns.

In some example embodiments, the index information may include at least one index value for the at least one measurement gap pattern to be applied to the bandwidth part.

In some example embodiments, the configuration information may include a plurality of information items for a measurement gap pattern parameter among a plurality of measurement gap pattern parameters associated with the plurality of measurement gap patterns, where an information item of the plurality of information items for the measurement gap pattern parameter may include a value of the measurement gap pattern parameter and an index corresponding to the value of the measurement gap pattern parameter.

In some example embodiments, the index information may include at least one index value associated with at least one measurement gap pattern parameter among the plurality of measurement gap pattern parameters.

In some example embodiments, two or more indexes in the configuration information may share a predetermined identifier. For example, two or more indexes in the configuration information may correspond to a substantially same predetermined identifier.

In some example embodiments, the configuration information may include an indication of at least one default pre-configured measurement gap pattern.

In some example embodiments, the index information may include at least one of: information for indicating to apply the at least one default pre-configured measurement gap pattern or at least one previous measurement gap pattern to the bandwidth part; and information for indicating whether to apply the at least one default pre-configured measurement gap pattern to the bandwidth part.

In some example embodiments, the index information may include at least one predetermined index or at least one empty index for indicating to deactivate at least one activated measurement gap pattern of the bandwidth part.

In some example embodiments, the configuration information may be received via at least one first downlink radio resource control signaling.

In some example embodiments, the index information may be received via downlink control information or at least one second downlink radio resource control signaling.

In some example embodiments, the index information may be received via downlink control information or at least one second downlink radio resource control signaling for a bandwidth part switch, and a delay of completing the bandwidth part switch may include both a pre-defined bandwidth part switch time and a measurement gap pattern application time.

In some example embodiments, another configuration information associated with another plurality of pre-configured measurement gap patterns may be received, and the configuration information may be updated based on the another configuration information.

In a fourth aspect, a computer readable medium is disclosed. The computer readable medium may include instructions stored thereon for causing an apparatus to perform the method in the first aspect. The instructions may cause the apparatus to perform: receiving configuration information associated with a plurality of pre-configured measurement gap patterns; receiving index information for configuring at least one measurement gap pattern of a bandwidth part; and configuring the at least one measurement gap pattern of the bandwidth part based on at least one of the configuration information and the index information. For example, the plurality of pre-configured measurement gap patterns may be associated with a plurality of bandwidth parts (for example, the whole of the plurality of bandwidth parts).

In some example embodiments, the configuration information may include a plurality of information items corresponding to the plurality of pre-configured measurement gap patterns, where an information item of the plurality of information items may include at least one of an index and a parameter configuration associated with a corresponding pre-configured measurement gap pattern.

In some example embodiments, the index of the corresponding pre-configured measurement gap pattern may be a predetermined identifier or may depend on an order of the corresponding pre-configured measurement gap pattern in the plurality of pre-configured measurement gap patterns.

In some example embodiments, the index information may include at least one index value for the at least one measurement gap pattern to be applied to the bandwidth part.

In some example embodiments, the configuration information may include a plurality of information items for a measurement gap pattern parameter among a plurality of measurement gap pattern parameters associated with the plurality of measurement gap patterns, where an information item of the plurality of information items for the measurement gap pattern parameter may include a value of the measurement gap pattern parameter and an index corresponding to the value of the measurement gap pattern parameter.

In some example embodiments, the index information may include at least one index value associated with at least one measurement gap pattern parameter among the plurality of measurement gap pattern parameters.

In some example embodiments, two or more indexes in the configuration information may share a predetermined identifier. For example, two or more indexes in the configuration information may correspond to a substantially same predetermined identifier.

In some example embodiments, the configuration information may include an indication of at least one default pre-configured measurement gap pattern.

In some example embodiments, the index information may include at least one of: information for indicating to apply the at least one default pre-configured measurement gap pattern or at least one previous measurement gap pattern to the bandwidth part; and information for indicating whether to apply the at least one default pre-configured measurement gap pattern to the bandwidth part.

In some example embodiments, the index information may include at least one predetermined index or at least one empty index for indicating to deactivate at least one activated measurement gap pattern of the bandwidth part.

In some example embodiments, the configuration information may be received via at least one first downlink radio resource control signaling.

In some example embodiments, the index information may be received via downlink control information or at least one second downlink radio resource control signaling.

In some example embodiments, the index information may be received via downlink control information or at least one second downlink radio resource control signaling for a bandwidth part switch, and a delay of completing the bandwidth part switch may include both a pre-defined bandwidth part switch time and a measurement gap pattern application time.

In some example embodiments, another configuration information associated with another plurality of pre-configured measurement gap patterns may be received, and the configuration information may be updated based on the another configuration information.

In a fifth aspect, disclosed is a method including: transmitting, to a mobile station, configuration information associated with a plurality of pre-configured measurement gap patterns; and transmitting, to the mobile station, index information for configuring at least one measurement gap pattern of a bandwidth part. For example, the plurality of pre-configured measurement gap patterns may be associated with a plurality of bandwidth parts (for example, the whole of the plurality of bandwidth parts).

In some example embodiments, the configuration information may include a plurality of information items corresponding to the plurality of pre-configured measurement gap patterns, where an information item of the plurality of information items may include at least one of an index and a parameter configuration associated with a corresponding pre-configured measurement gap pattern.

In some example embodiments, the index of the corresponding pre-configured measurement gap pattern may be a predetermined identifier or may depend on an order of the corresponding pre-configured measurement gap pattern in the plurality of pre-configured measurement gap patterns.

In some example embodiments, the index information may include at least one index value for the at least one measurement gap pattern to be applied to the bandwidth part.

In some example embodiments, the configuration information may include a plurality of information items for a measurement gap pattern parameter among a plurality of measurement gap pattern parameters associated with the plurality of measurement gap pattern parameters, where an information item of the plurality of information items for the measurement gap pattern parameter may include a value of the measurement gap pattern parameter and an index corresponding to the value of the measurement gap pattern parameter.

In some example embodiments, the index information may include at least one index value associated with at least one measurement gap pattern parameter among the plurality of measurement gap pattern parameters.

In some example embodiments, two or more indexes in the configuration information may share a predetermined identifier. For example, two or more indexes in the configuration information may correspond to a substantially same predetermined identifier.

In some example embodiments, the configuration information may include an indication of at least one default pre-configured measurement gap pattern.

In some example embodiments, the index information may include at least one of: information for indicating to apply the at least one default pre-configured measurement gap pattern or at least one previous measurement gap pattern to the bandwidth part; and information for indicating whether to apply the at least one default pre-configured measurement gap pattern to the bandwidth part.

In some example embodiments, the index information may include at least one predetermined index or at least one empty index for indicating to deactivate at least one activated measurement gap pattern of the bandwidth part.

In some example embodiments, the configuration information may be determined based on capability of the mobile station.

In some example embodiments, the configuration information may be transmitted via at least one first downlink radio resource control signaling.

In some example embodiments, the index information may be transmitted via downlink control information or at least one second downlink radio resource control signaling.

In some example embodiments, the index information may be transmitted via downlink control information or at least one second downlink radio resource control signaling for a bandwidth part switch, and a delay of completing the bandwidth part switch may include both a pre-defined bandwidth part switch time and a measurement gap pattern application time.

In some example embodiments, another configuration information associated with another plurality of pre-configured measurement gap patterns may be received from a network node, and the configuration information may be determined based on at least one of the another configuration information and capability of the mobile station.

In some example embodiments, the configuration may further be transmitted to a network node.

In a sixth aspect, disclosed is an apparatus which may be configured to perform at least the method in the fifth aspect. The apparatus may include at least one processor and at least one memory. The at least one memory may include computer program code, and the at least one memory and the computer program code may be configured to, with the at least one processor, cause the apparatus to perform: transmitting, to a mobile station, configuration information associated with a plurality of pre-configured measurement gap patterns; and transmitting, to the mobile station, index information for configuring at least one measurement gap pattern of a bandwidth part. For example, the plurality of pre-configured measurement gap patterns may be associated with a plurality of bandwidth parts (for example, the whole of the plurality of bandwidth parts).

In some example embodiments, the configuration information may include a plurality of information items corresponding to the plurality of pre-configured measurement gap patterns, where an information item of the plurality of information items may include at least one of an index and a parameter configuration associated with a corresponding pre-configured measurement gap pattern.

In some example embodiments, the index of the corresponding pre-configured measurement gap pattern may be a predetermined identifier or may depend on an order of the corresponding pre-configured measurement gap pattern in the plurality of pre-configured measurement gap patterns.

In some example embodiments, the index information may include at least one index value for the at least one measurement gap pattern to be applied to the bandwidth part.

In some example embodiments, the configuration information may include a plurality of information items for a measurement gap pattern parameter among a plurality of measurement gap pattern parameters associated with the plurality of measurement gap pattern parameters, where an information item of the plurality of information items for the measurement gap pattern parameter may include a value of the measurement gap pattern parameter and an index corresponding to the value of the measurement gap pattern parameter.

In some example embodiments, the index information may include at least one index value associated with at least one measurement gap pattern parameter among the plurality of measurement gap pattern parameters.

In some example embodiments, two or more indexes in the configuration information may share a predetermined identifier. For example, two or more indexes in the configuration information may correspond to a substantially same predetermined identifier.

In some example embodiments, the configuration information may include an indication of at least one default pre-configured measurement gap pattern.

In some example embodiments, the index information may include at least one of: information for indicating to apply the at least one default pre-configured measurement gap pattern or at least one previous measurement gap pattern to the bandwidth part; and information for indicating whether to apply the at least one default pre-configured measurement gap pattern to the bandwidth part.

In some example embodiments, the index information may include at least one predetermined index or at least one empty index for indicating to deactivate at least one activated measurement gap pattern of the bandwidth part.

In some example embodiments, the configuration information may be determined based on capability of the mobile station.

In some example embodiments, the configuration information may be transmitted via at least one first downlink radio resource control signaling.

In some example embodiments, the index information may be transmitted via downlink control information or at least one second downlink radio resource control signaling.

In some example embodiments, the index information may be transmitted via downlink control information or at least one second downlink radio resource control signaling for a bandwidth part switch, and a delay of completing the bandwidth part switch may include both a pre-defined bandwidth part switch time and a measurement gap pattern application time.

In some example embodiments, another configuration information associated with another plurality of pre-configured measurement gap patterns may be received from a network node, and the configuration information may be determined based on at least one of the another configuration information and capability of the mobile station.

In some example embodiments, the configuration may further be transmitted to a network node.

In a seventh aspect, disclosed is an apparatus which may be configured to perform at least the method in the fifth aspect. The apparatus may include: means for transmitting, to a mobile station, configuration information associated with a plurality of pre-configured measurement gap patterns; and means for transmitting, to the mobile station, index information for configuring at least one measurement gap pattern of a bandwidth part. For example, the plurality of pre-configured measurement gap patterns may be associated with a plurality of bandwidth parts (for example, the whole of the plurality of bandwidth parts).

In some example embodiments, the configuration information may include a plurality of information items corresponding to the plurality of pre-configured measurement gap patterns, where an information item of the plurality of information items may include at least one of an index and a parameter configuration associated with a corresponding pre-configured measurement gap pattern.

In some example embodiments, the index of the corresponding pre-configured measurement gap pattern may be a predetermined identifier or may depend on an order of the corresponding pre-configured measurement gap pattern in the plurality of pre-configured measurement gap patterns.

In some example embodiments, the index information may include at least one index value for the at least one measurement gap pattern to be applied to the bandwidth part.

In some example embodiments, the configuration information may include a plurality of information items for a measurement gap pattern parameter among a plurality of measurement gap pattern parameters associated with the plurality of measurement gap pattern parameters, where an information item of the plurality of information items for the measurement gap pattern parameter may include a value of the measurement gap pattern parameter and an index corresponding to the value of the measurement gap pattern parameter.

In some example embodiments, the index information may include at least one index value associated with at least one measurement gap pattern parameter among the plurality of measurement gap pattern parameters.

In some example embodiments, two or more indexes in the configuration information may share a predetermined identifier. For example, two or more indexes in the configuration information may correspond to a substantially same predetermined identifier.

In some example embodiments, the configuration information may include an indication of at least one default pre-configured measurement gap pattern.

In some example embodiments, the index information may include at least one of: information for indicating to apply the at least one default pre-configured measurement gap pattern or at least one previous measurement gap pattern to the bandwidth part; and information for indicating whether to apply the at least one default pre-configured measurement gap pattern to the bandwidth part.

In some example embodiments, the index information may include at least one predetermined index or at least one empty index for indicating to deactivate at least one activated measurement gap pattern of the bandwidth part.

In some example embodiments, the configuration information may be determined based on capability of the mobile station.

In some example embodiments, the configuration information may be transmitted via at least one first downlink radio resource control signaling.

In some example embodiments, the index information may be transmitted via downlink control information or at least one second downlink radio resource control signaling.

In some example embodiments, the index information may be transmitted via downlink control information or at least one second downlink radio resource control signaling for a bandwidth part switch, and a delay of completing the bandwidth part switch may include both a pre-defined bandwidth part switch time and a measurement gap pattern application time.

In some example embodiments, another configuration information associated with another plurality of pre-configured measurement gap patterns may be received from a network node, and the configuration information may be determined based on at least one of the another configuration information and capability of the mobile station.

In some example embodiments, the configuration may further be transmitted to a network node.

In an eighth aspect, a computer readable medium is disclosed. The computer readable medium may include instructions stored thereon for causing an apparatus to perform the method in the fifth aspect. The instructions may cause the apparatus to perform: transmitting, to a mobile station, configuration information associated with a plurality of pre-configured measurement gap patterns; and transmitting, to the mobile station, index information for configuring at least one measurement gap pattern of a bandwidth part. For example, the plurality of pre-configured measurement gap patterns may be associated with a plurality of bandwidth parts (for example, the whole of the plurality of bandwidth parts).

In some example embodiments, the configuration information may include a plurality of information items corresponding to the plurality of pre-configured measurement gap patterns, where an information item of the plurality of information items may include at least one of an index and a parameter configuration associated with a corresponding pre-configured measurement gap pattern.

In some example embodiments, the index of the corresponding pre-configured measurement gap pattern may be a predetermined identifier or may depend on an order of the corresponding pre-configured measurement gap pattern in the plurality of pre-configured measurement gap patterns.

In some example embodiments, the index information may include at least one index value for the at least one measurement gap pattern to be applied to the bandwidth part.

In some example embodiments, the configuration information may include a plurality of information items for a measurement gap pattern parameter among a plurality of measurement gap pattern parameters associated with the plurality of measurement gap pattern parameters, where an information item of the plurality of information items for the measurement gap pattern parameter may include a value of the measurement gap pattern parameter and an index corresponding to the value of the measurement gap pattern parameter.

In some example embodiments, the index information may include at least one index value associated with at least one measurement gap pattern parameter among the plurality of measurement gap pattern parameters.

In some example embodiments, two or more indexes in the configuration information may share a predetermined identifier. For example, two or more indexes in the configuration information may correspond to a substantially same predetermined identifier.

In some example embodiments, the configuration information may include an indication of at least one default pre-configured measurement gap pattern.

In some example embodiments, the index information may include at least one of: information for indicating to apply the at least one default pre-configured measurement gap pattern or at least one previous measurement gap pattern to the bandwidth part; and information for indicating whether to apply the at least one default pre-configured measurement gap pattern to the bandwidth part.

In some example embodiments, the index information may include at least one predetermined index or at least one empty index for indicating to deactivate at least one activated measurement gap pattern of the bandwidth part.

In some example embodiments, the configuration information may be determined based on capability of the mobile station.

In some example embodiments, the configuration information may be transmitted via at least one first downlink radio resource control signaling.

In some example embodiments, the index information may be transmitted via downlink control information or at least one second downlink radio resource control signaling.

In some example embodiments, the index information may be transmitted via downlink control information or at least one second downlink radio resource control signaling for a bandwidth part switch, and a delay of completing the bandwidth part switch may include both a pre-defined bandwidth part switch time and a measurement gap pattern application time.

In some example embodiments, another configuration information associated with another plurality of pre-configured measurement gap patterns may be received from a network node, and the configuration information may be determined based on at least one of the another configuration information and capability of the mobile station.

In some example embodiments, the configuration may further be transmitted to a network node.

BRIEF DESCRIPTION OF THE DRAWINGS

Some embodiments will now be described, by way of non-limiting examples, with reference to the accompanying drawings.

DETAILED DESCRIPTION

At least one MGP may be pre-configured by network (NW) for at least one bandwidth part (BWP) supported by the UE, and configuration information associated with the pre-configured MGPs may be provided, together with configuration information associated with the at least one BWP supported by the UE as well as an association between the at least one BWP and the at least one pre-configured MGP, to the UE via downlink radio resource control (RRC) signaling (for example, a downlink RRC reconfiguration message).

Figure 1:
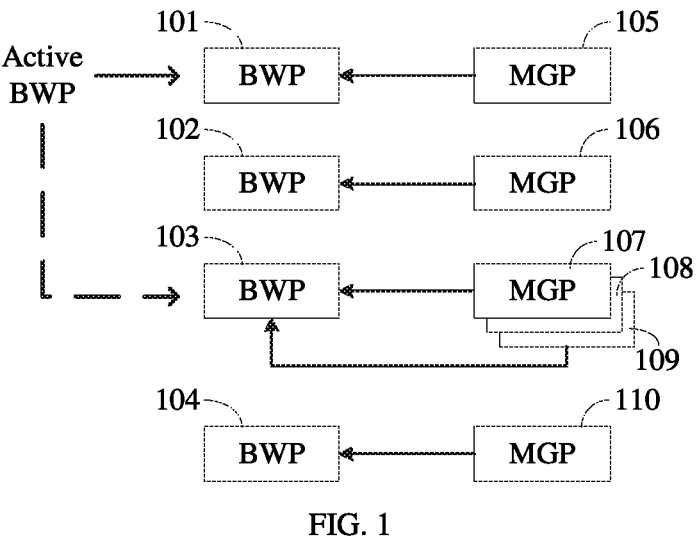
FIG. 1 illustrates an example of configuring MGP in an example embodiment.

For example, as illustrated in FIG. 1, 4 BWPs 101, 102, 103, and 104 are configured for the UE, where the BWP 101 is an active BWP with MGP 105 pre-configured and activated, the BWP 102 is currently inactive and is pre-configured with MGP 106, the BWP 103 is currently inactive and is pre-configured with MGPs 107, 108 and 109, and the BWP 104 is currently inactive and is pre-configured with MGP 110. Then, when the BWP 102 is switched to be the active BWP, the UE may determine autonomously to activate the MGP 106 for the active BWP 102, based on the association between the BWPs and the pre-configured MGPs. Similarly, when the BWP 104 is switched to be the active BWP, the UE may determine autonomously to activate the MGP 110 for the active BWP 104, based on the association between the BWPs and the pre-configured MGPs. However, when the BWP 103 is switched to be the active BWP, extra downlink signaling (for example, extra downlink RRC signaling) may be needed, for example to indicate to the UE which one or which ones of the MGPs 107, 108, and 109 is to be activated for the active BWP 103. Such extra downlink signaling may slow down MG configuration and increase measurement latency, for example.

Further, for a pre-configured MGP associated with an inactive BWP, before activating the pre-configured MGP, one or more MGP parameters may become inappropriate for example due to a change of quality of service (QoS) requirements. Then, extra downlink signaling (for example, extra downlink RRC signaling) may be needed, for example to provide a re-configuration of one or more MGP parameters or to configure another appropriate MGP, which may also slow down MG configuration and increase measurement latency.

Figure 2:
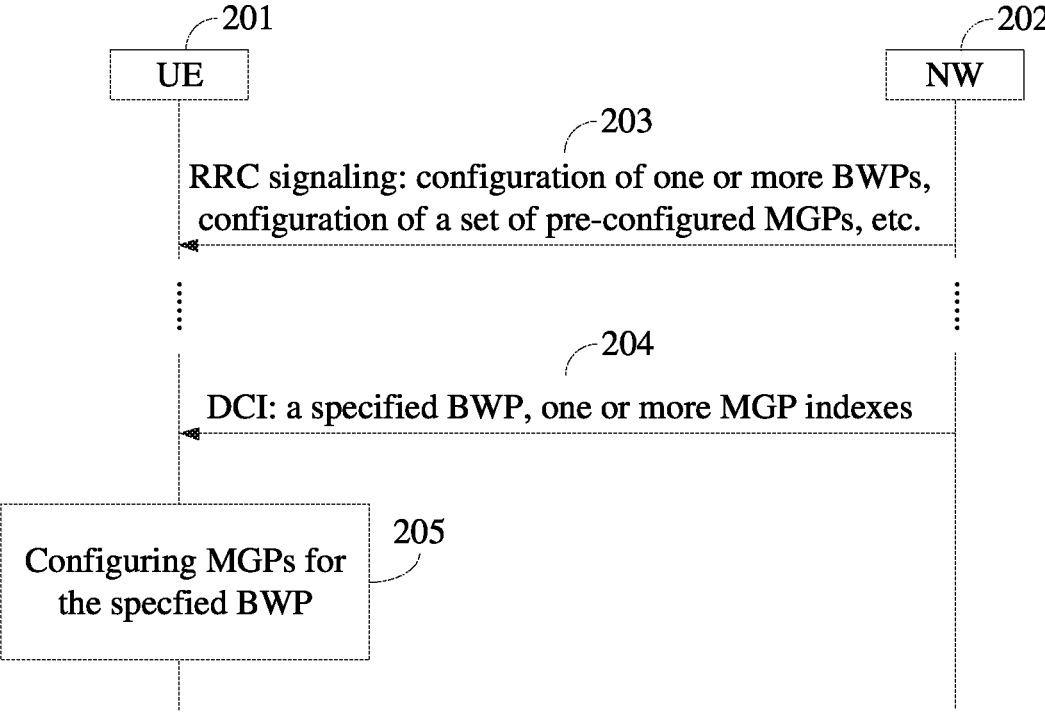
FIG. 2 illustrates an example procedure of configuring MGP in an example embodiment.

FIG. 2 illustrates an example procedure of configuring MGP in an example embodiment.

In the example procedure as illustrated in FIG. 2, UE 201 may receive, from network 202 (for example, a base station or BS associated with a serving cell), information 203 including configuration information associated with one or more BWPs and configuration information associated with a set of pre-configured MGPs. For example, the information 203 does not include information associated with an association between the one or more BWPs and the set of pre-configured MGPs.

As illustrated in FIG. 2, the information 203 may be carried via at least one downlink RRC signaling from the network 202 to the UE 201, for example a downlink RRC reconfiguration message from the network 202 to the UE 201.

For example, the set of pre-configured MGPs configured in the information 203 may be determined based on one or more considerations such as capability of the UE 201, one or more service types (for example, at least one pre-configured MGP in the set may be associated with a service type), and so on, and may be applied to all or some BWPs configured for the UE 201.

For example, configuration information associated with the set of pre-configured MGPs may include parameter configurations of respective pre-configured MGPs in the set. For example, a pre-configured MGP in the set may correspond to a combination of predetermined MGP parameter values for MGP parameters including MGL, MGRP, gap offset, MGTA, and so on, which may be included in the information 203 for a type of service, and another pre-configured MGP in the set may correspond to another combination of predetermined MGP parameter values for MGP parameters including MGL, MGRP, gap offset, MGTA, and so on, which for example may be included in the information 203 for another type of service.

Further, at least one pre-configured MGP may be indexed in the set of pre-configured MGPs. For example, indexes of respective pre-configured MGPs in the set may be predetermined identifiers configured by the network 202. In another example, the indexes of respective pre-configured MGPs in the set may be implicit, for example corresponding to or depending on orders or positions of respective pre-configured MGPs in the set.

In another example, one or more (for example, all) pre-configured MGPs in the set may correspond to one or more MGPs which have been specified in 3rd Generation Partnership Project (3GPP) technique specification (TS), such as GP1, GP2, GP25, and so on. Then, the indexes of respective pre-configured MGPs in the set, which are included in the information 203, may be indexes to those MGPs specified in the 3GPP TS, and corresponding MGP parameter configurations (which have been specified in the 3GPP TS) may be omitted in the configuration information associated with respective pre-configured MGPs in the set.

For example, at least one pre-configure MGP in the set may be configured with a unique index. In some another examples, one or more pre-configured MGPs in the set may share an index. For example, one or more pre-configured MGPs in the set may have a substantially same index.

It is appreciated that although the information 203 in FIG. 1 includes both configuration information associated with one or more BWPs and configuration information associated with the set of pre-configured MGPs, in another example, configuration information associated with one or more BWPs and configuration information associated with the set of pre-configured MGPs may also be transmitted from the network 202 to the UE 201 via separated downlink RRC signaling, for example via separated downlink RRC reconfiguration messages. In yet another example, the configuration information associated with the set of pre-configured MGPs may also be transmitted from the network 202 to the UE 201 via more than one downlink RRC signaling.

Further, as illustrated in FIG. 2, the UE 201 may receive, from the network 202, information 204 including an indication of a specified BWP and one or more MGP indexes for configuring MGPs of the specified BWP. For example, the network 202 may determine one or more MGPs to be configured for one BWP of the UE 201 based on an ongoing service type associated with the UE 201, and may transmit the information 204 to the UE 201.

In the example as illustrated in FIG. 2, the information 204 is carried in downlink control information (DCI), for example DCI for BWP switch. For example, DCI format size may be extended to indicate the one or more MGP indexes for configuring MGPs of the specified BWP. For example, if the set of pre-configured MGPs provided in the information 203 include maximum 8 MGPs, DCI format used for the information 204 may be extended with 3 bits to indicate the one or more MGP indexes for configuring MGPs of the specified BWP. In another example, the information 204 may also be carried via at least one RRC signaling, for example at least one RRC signaling for BWP switch.

Then, as illustrated in FIG. 2, when receiving the information 204, the UE 201 may perform an operation 205 to configure MGPs for the BWP specified in the information 204 based on at least one of the information 203 and the information 204.

For example, when receiving the information 204, in the operation 205, the UE 201 may search the set of pre-configured MGPs in the information 203 based on the one or more MGP indexes in the information 204, and may determine one or more pre-configured MGPs from the set which indexes match with the one or more MGP indexes in the information 204.

Then, for example, if the BWP specified in the information 204 is the active BWP, in the operation 205, the UE 201 may deactivate original MGP(s) for the active BWP, and may activate or apply the one or more determined pre-configured MGPs for the active BWP.

For example, if the BWP specified in the information 204 is different from the current active BWP, in the operation 205, the UE 201 may switch the active BWP to be the BWP specified in the information 204, and may activate or apply the one or more determined pre-configured MGPs for the active BWP.

For example, if the BWP specified in the information 204 is the current active BWP but no pre-configured MGPs in the set of pre-configured MGPs corresponds to one or more MGP indexes specified in the information 204, for example the one or more MGP indexes are one or more predetermined special indexes, then one or more activated MGPs of the current active BWP may be deactivated.

Figure 3:
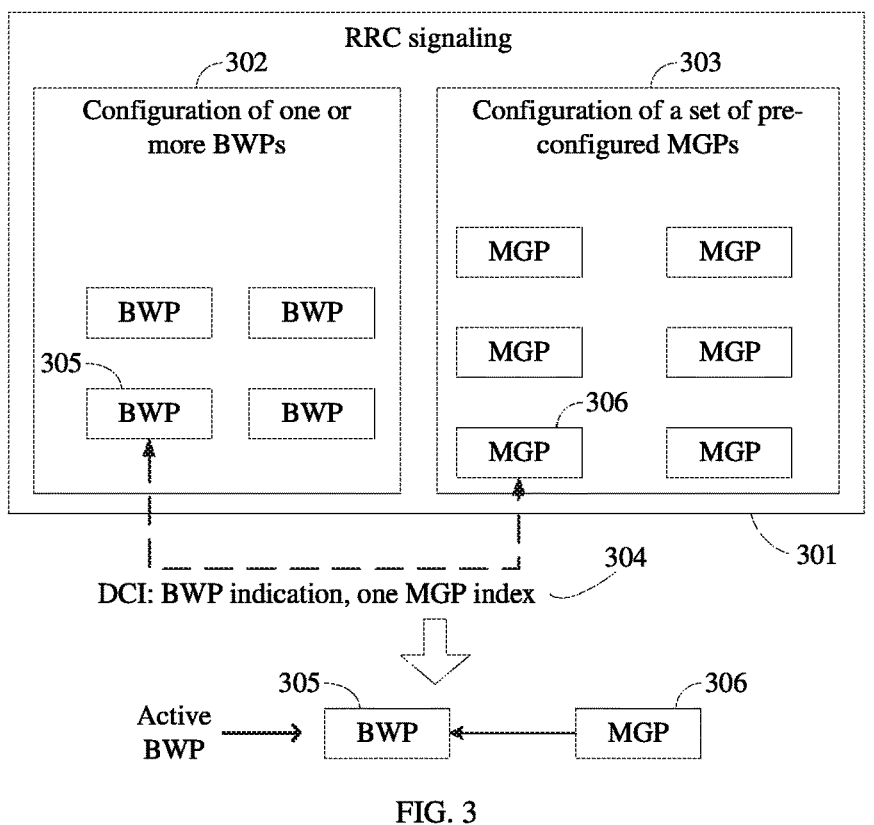
FIG. 3 illustrates an example of configuring MGP in an example embodiment.

FIG. 3 illustrates an example of configuring MGP in an example embodiment, where RRC signaling 301 may be an example of the information 203 in FIG. 2, and may include configuration information 302 associated with one or more BWPs for the UE (for example, the UE 201 in FIG. 2) and configuration information 303 associated with a set of pre-configured MGPs. In the RRC signaling 301, no association information between the information 302 and the information 303 is included.

Then, in the example of FIG. 3, the network (for example, the network 202 in FIG. 2) may transmit DCI 304 specifying an indication of a BWP and an index of a MGP, which may be an example of the information 204 in FIG. 2.

When receiving the DCI 304, the UE may determine BWP 305 from the one or more BWP of the UE configured in the configuration information 302, based on the BWP indication specified in the DCI 304, and may determine a pre-configured MGP 306 from the set of pre-configured MGPs configured in the configuration information 303, based on the MGP index specified in the DCI 304. Thus, as illustrated in FIG. 3, an association between the BWP 305 and the pre-configured MGP 306 may be determined by the UE.

Then, for example in the operation 205 in FIG. 2, the UE may make or keep the BWP 305 to be the active BWP, and may activate the pre-configured MGP 306 for the active BWP 305.

Figure 4:
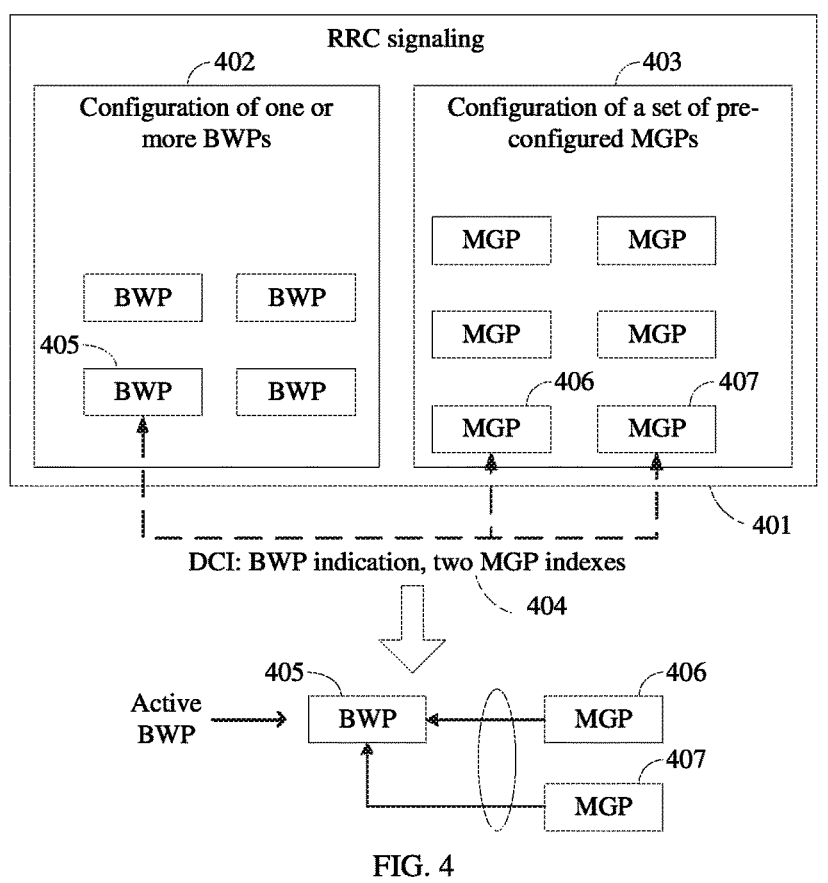
FIG. 4 illustrates an example of configuring MGP in an example embodiment.

FIG. 4 illustrates another example of configuring MGP in an example embodiment, where RRC signaling 401 may be another example of the information 203 in FIG. 2, and may include configuration information 402 associated with one or more BWPs for the UE (for example, the UE 201 in FIG. 2) and configuration information 403 associated with a set of pre-configured MGPs. Also, in the RRC signaling 401, no association information between the information 402 and the information 403 is included.

Then, in the example of FIG. 4, the network (for example, the network 202 in FIG. 2) may transmit DCI 404 specifying an indication of a BWP and two MGP indexes, which may be an example of the information 204 in FIG. 2.

When receiving the DCI 404, the UE may determine BWP 405 from the one or more BWP of the UE configured in the configuration information 402, based on the BWP indication specified in the DCI 404, and may determine two pre-configured MGPs 406 and 407 from the set of pre-configured MGPs configured in the configuration information 403, based on the MGP index specified in the DCI 404. Thus, as illustrated in FIG. 4, an association between the BWP 405 and the pre-configured MGPs 406 and 407 may be determined by the UE.

Then, for example in the operation 205 in FIG. 2, the UE may make or keep the BWP 405 to be the active BWP, and may activate both two pre-configured MGPs 406 and 407 for the active BWP 405. For example, this may happen when concurrent measurement gaps are supported by the UE and are required for example due to multiple service types. Thus, for example, concurrent MGPs for one BWP may be enabled. In another example, the UE may activate one of the two pre-configured MGP at one time and alternate between them. For example, the activated pre-configured 406 may be used for the BWP 405 during one or more predetermined periods, and the activated pre-configured 407 may be used for the BWP 405 during one or more another predetermined periods.

Figure 5:
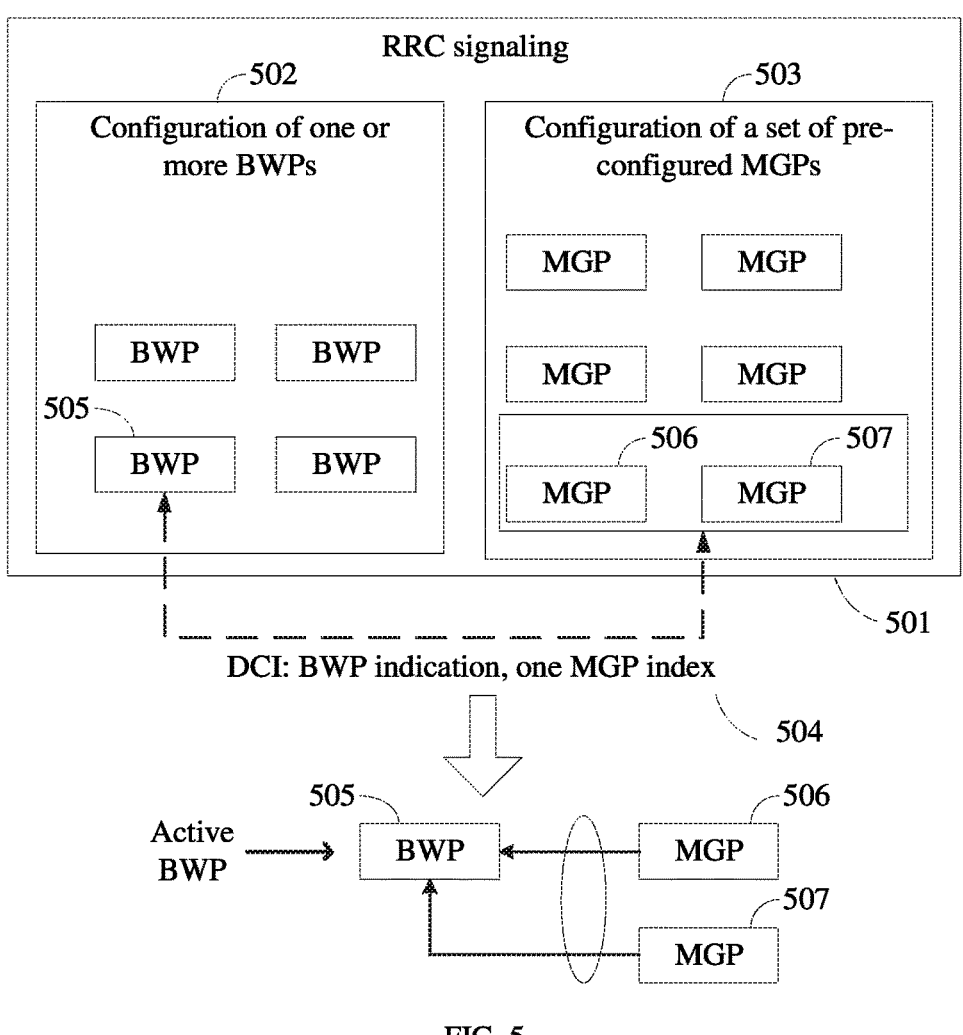
FIG. 5 illustrates an example of configuring MGP in an example embodiment.

FIG. 5 illustrates another example of configuring MGP in an example embodiment, where RRC signaling 501 may be another example of the information 203 in FIG. 2, and may include configuration information 502 associated with one or more BWPs for the UE (for example, the UE 201 in FIG. 2) and configuration information 503 associated with a set of pre-configured MGPs. Also, in the RRC signaling 501, no association information between the information 502 and the information 503 is included.

Then, in the example of FIG. 5, the network (for example, the network 202 in FIG. 2) may transmit DCI 504 specifying an indication of a BWP and an MGP index, which may be an example of the information 204 in FIG. 2.

When receiving the DCI 504, the UE may determine BWP 505 from the one or more BWP of the UE configured in the configuration information 502, based on the BWP indication specified in the DCI 504, and may determine that two pre-configured MGPs 506 and 507 in the set of pre-configured MGPs configured in the configuration information 503 are sharing the substantially same index, and the substantially same index matches with the MGP index specified in the DCI 504. Thus, as illustrated in FIG. 5, an association between the BWP 505 and the pre-configured MGPs 506 and 507 may be determined by the UE.

Then, for example in the operation 205 in FIG. 2, the UE may make or keep the BWP 505 to be the active BWP, and may activate both two pre-configured MGPs 506 and 507 for the active BWP 505. Thus, for example, concurrent MGPs for one BWP may be enabled. For example, the activated pre-configured 506 may be used for the BWP 505 during one or more predetermined periods, and the activated pre-configured 507 may be used for the BWP 405 during one or more another predetermined periods.

Figure 6:
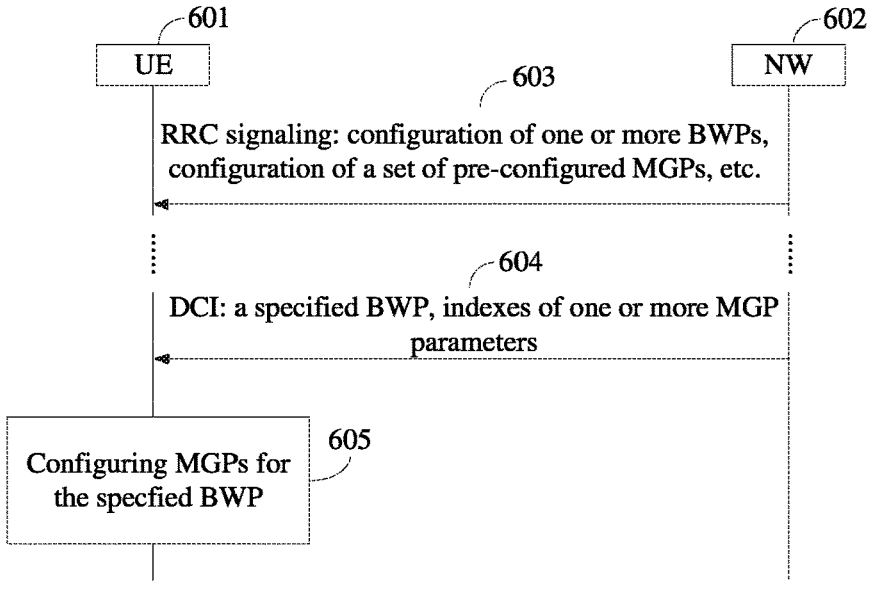
FIG. 6 illustrates an example procedure of configuring MGP in an example embodiment.

FIG. 6 illustrates another example procedure of configuring MGP in an example embodiment.

Similar to the example procedure as illustrated in FIG. 2, in the example procedure as illustrated in FIG. 6, UE 601 may receive, from network 602 (for example, a base station or BS associated with a serving cell), information 603 including configuration information associated with one or more BWPs and configuration information associated with a set of pre-configured MGPs. For example, the information 603 does not include information associated with an association between the one or more BWPs and the set of pre-configured MGPs.

As illustrated in FIG. 6, the information 603 may be carried via at least one downlink RRC signaling from the network 602 to the UE 601, for example at least one downlink RRC reconfiguration message from the network 602 to the UE 601.

For example, the set of pre-configured MGPs configured in the information 603 may be determined based on one or more considerations such as capability of the UE 601, one or more service types (for example, at least one pre-configured MGP in the set may be associated with a service type), and so on, and may be applied to all or some BWPs configured for the UE 601.

For example, for at least one MGP parameter of one or more MGP parameters including MGL, MGRP, gap offset, MGTA, and so on, configuration information associated with the set of pre-configured MGPs may a set of parameter values for the MGP parameter. For example, for the parameter MGL, the configuration information associated with the set of pre-configured MGPs may include one or more values configurable for the parameter MGL, and for the parameter MGRP, the configuration information associated with the set of pre-configured MGPs may include one or more values configurable for the parameter MGRP. Then, a pre-configured MGP in the set may correspond to or depend on a combination of values of different MGP parameters.

Further, for at least one value configurable for a MGP parameter, it may be configured with an index. For example, indexes of respective values of respective MGP parameters may be predetermined identifiers configured by the network 202. In another example, an index of a value of a MGP parameter may be implicit, for example corresponding to or depending on an order or a position of the value in the set or list of the configurable values for the MGP parameter.

For example, at least one value of a MGP parameter may be configured with a unique index, for example at least in the set or list of the configurable values for the MGP parameter. In some another examples, one or more values of a MGP parameter may share an index. For example, one or more values of a MGP parameter may have a substantially same index.

It is appreciated that although the information 603 in FIG. 6 includes both configuration information associated with one or more BWPs and configuration information associated with the set of pre-configured MGPs, in another example, configuration information associated with one or more BWPs and configuration information associated with the set of pre-configured MGPs may also be transmitted from the network 602 to the UE 601 via separated downlink RRC signaling, for example via separated downlink RRC reconfiguration messages. In yet another example, the configuration information associated with the set of pre-configured MGPs may also be transmitted from the network 602 to the UE 601 via more than one downlink RRC signaling.

Further, as illustrated in FIG. 6, the UE 601 may receive, for the network 602, information 604 including an indication of a specified BWP and one or more MGP parameter indexes for configuring MGPs of the specified BWP. For example, the network 602 may determine one or more MGP parameter indexes to be configured for one BWP of the UE 601 based on an ongoing service type associated with the UE 601, and may transmit the information 604 to the UE 601.

In the example as illustrated in FIG. 6, the information 604 is carried in DCI, for example DCI for BWP switch. For example, DCI format used for the information 604 may be extended with a plurality of bits, where a part of bits may be used to indicate an index of MGL parameter, another part of bits may be used to indicate an index of MGRP parameter, and so on. In another example, the information 604 may also be carried via at least one RRC signaling, for example at least one RRC signaling for BWP switch.

Then, as illustrated in FIG. 6, when receiving the information 604, the UE 601 may perform an operation 605 to configure MGPs for the BWP specified in the information 604 based on at least one of the information 603 and the information 604.

For example, when receiving the information 604, in the operation 605, for at least one MGP parameter index in the information 604, the UE 601 may determine a value of a corresponding MGP parameter from the configuration information associated with the set of pre-configured MGPs, where the index of the determined value matches with the corresponding MGP parameter index. Thus, the UE 601 may determine a set of values of one or more MGP parameters for the specified BWP.

Then, for example, if the BWP specified in the information 604 is the active BWP, in the operation 605, the UE 601 may activate or apply the determined values of the one or more MGP parameters for the active BWP, so that a quick modification of the one or more MGP parameters may be implemented for the active BWP.

For example, if the BWP specified in the information 604 is different from the current active BWP, in the operation 605, the UE 601 may switch the active BWP to be the BWP specified in the information 604, and may activate or apply one or more MGPs, where values of one or more MGP parameters of the one or more MGPs may be configured based on the determined set of values.

For example, if the BWP specified in the information 604 is the current active BWP but no corresponding values are found in the configuration of the set of pre-configured MGPs for one or more MGP parameter indexes specified in the information 604, for example, the one or more corresponding MGP parameters may be ignored, or one or more activated MGPs of the current active BWP may be deactivated.

Through the example procedure as illustrated in FIG. 6, for example, one or more parameter values of one or more MGPs for a specified BWP may be specified/adjusted quickly.

Figure 7:
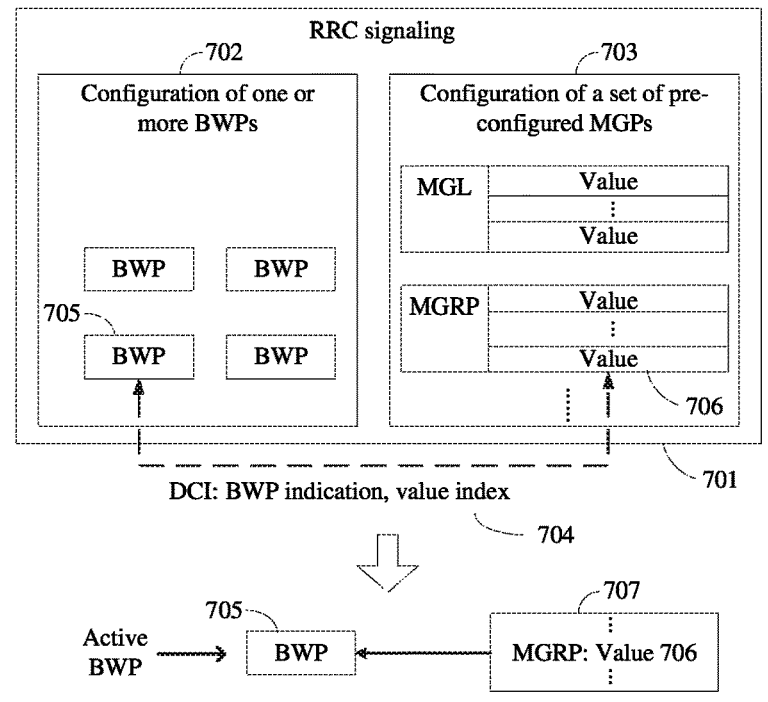
FIG. 7 illustrates an example of configuring MGP in an example embodiment.

FIG. 7 illustrates an example of configuring MGP in an example embodiment, where RRC signaling 701 may be an example of the information 603 in FIG. 6, and may include configuration information 702 associated with one or more BWPs for the UE (for example, the UE 601 in FIG. 6) and configuration information 703 associated with a set of pre-configured MGPs. In the RRC signaling 701, no association information between the information 702 and the information 703 is included.

Then, in the example of FIG. 7, the network (for example, the network 602 in FIG. 6) may transmit DCI 704 specifying an indication of a BWP and an index of a value of a MGP parameter, which may be an example of the information 604 in FIG. 6.

When receiving the DCI 704, the UE may determine BWP 705 from the one or more BWP of the UE configured in the configuration information 702, based on the BWP indication specified in the DCI 704, and may determine a value 706 of the MGRP parameter from the configuration of the set of pre-configured MGPs configured in the configuration information 703, based on the MGP parameter value index specified in the DCI 704. Thus, as illustrated in FIG. 7, an association between the BWP 705 and the value 706 of the MGRP parameter may be determined by the UE.

Then, for example in the operation 605 in FIG. 6, the UE may make or keep the BWP 705 to be the active BWP, and may change a value of the MGRP parameter applied to the active BWP to be the value 706. Thus, a quick change of the MGP parameter value may be implemented.

Figure 8:
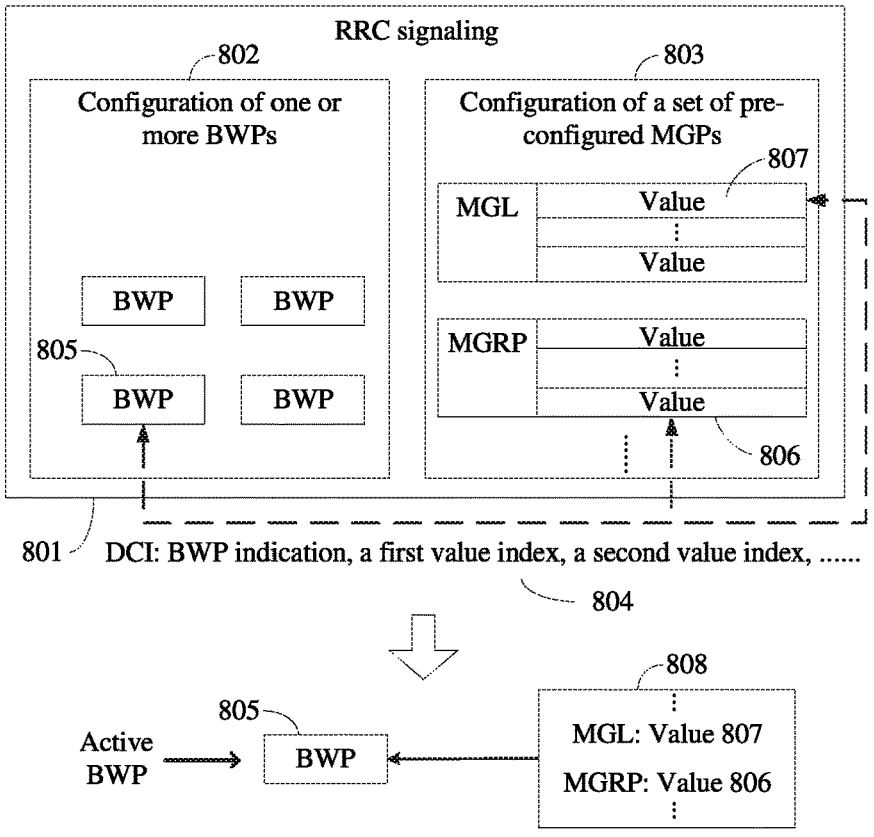
FIG. 8 illustrates an example of configuring MGP in an example embodiment.

FIG. 8 illustrates an example of configuring MGP in an example embodiment, where RRC signaling 801 may be an example of the information 603 in FIG. 6, and may include configuration information 802 associated with one or more BWPs for the UE (for example, the UE 601 in FIG. 6) and configuration information 803 associated with a set of pre-configured MGPs. In the RRC signaling 801, no association information between the information 802 and the information 803 is included.

Then, in the example of FIG. 8, the network (for example, the network 602 in FIG. 6) may transmit DCI 804 specifying an indication of a BWP and indexes of two or more values of MGP parameters, which may be an example of the information 604 in FIG. 6.

When receiving the DCI 804, the UE may determine BWP 805 from the one or more BWP of the UE configured in the configuration information 802, based on the BWP indication specified in the DCI 804, and may determine a value 806 of the MGRP parameter, a value 807 of the MGL parameter, and so on, from the configuration of the set of pre-configured MGPs configured in the configuration information 803, based on the MGP parameter value index specified in the DCI 804. Thus, as illustrated in FIG. 8, an association between the BWP 805 and a plurality of MGP parameter values, including the value 806 of the MGRP parameter and the value 807 of the MGL parameter value, may be determined by the UE.

Then, for example in the operation 605 in FIG. 6, the UE may make or keep the BWP 805 to be the active BWP, and may configure a MGP for the active BWP 805 or modify two or more MGP parameters of the activated MGP of the active BWP 805 based on the determined MGP parameter values, where a value of the MGRP parameter applied to the active BWP may be the value 806 and a value of the MGL parameter applied to the active BWP may be the value 807. Thus, a quick application or change of a plurality of MGP parameter values may be implemented.

In some examples, one or more MGP parameter values pre-configured in the configuration information associated with the set of pre-configured MGPs (for example, the information 703 or the information 803) may share a substantially same index. In some examples, two or more value indexes specified for example in the information 604 of FIG. 6 may intend to correspond to two or more values of one MGP parameter pre-configured in the configuration information associated with the set of pre-configured MGPs.

In some examples, the configuration information associated with a set of pre-configured MGPs may include both configuration information in a form for example as illustrated in FIG. 2 to FIG. 5 and configuration information in a form for example as illustrated in FIG. 6 to FIG. 8, so that both a pre-configured MGP and one or more MGP parameters may be adjusted quickly for a specified BWP, for example when BWP switches.

Figure 9:
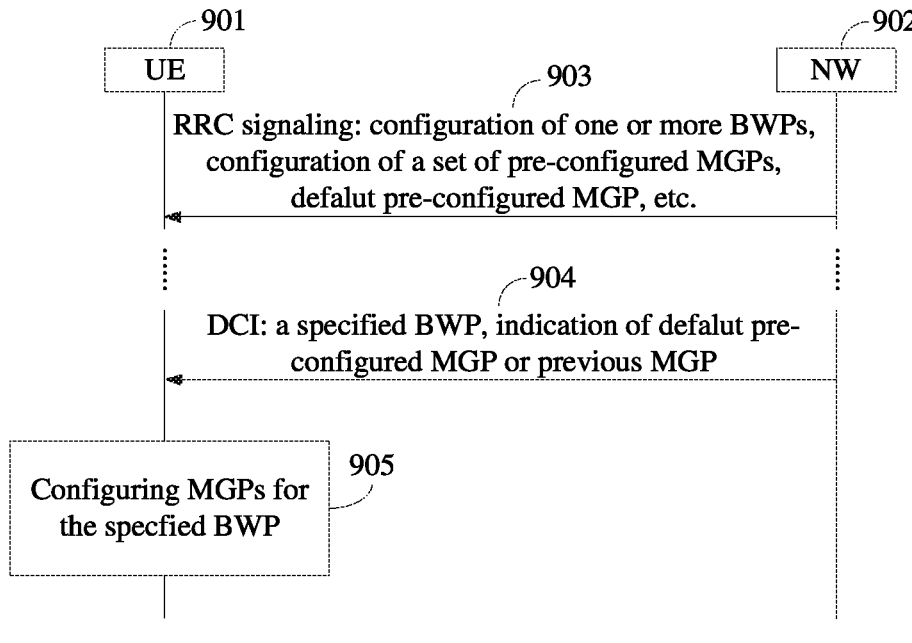
FIG. 9 illustrates an example procedure of configuring MGP in an example embodiment.

FIG. 9 illustrates another example procedure of configuring MGP in an example embodiment.

Similar to the example procedure as illustrated in FIG. 2 or FIG. 6, in the example procedure as illustrated in FIG. 9, UE 901 may receive, from network 902 (for example, a base station or BS associated with a serving cell), information 903 including configuration information associated with one or more BWPs and configuration information associated with a set of pre-configured MGPs, where the configuration information associated with the set of pre-configured MGPs may include at least one of configuration information in a form for example as illustrated in FIG. 2 to FIG. 5 and configuration information in a form for example as illustrated in FIG. 6 to FIG. 8. For example, the information 903 does not include information associated with an association between the one or more BWPs and the set of pre-configured MGPs.

In addition, as illustrated in FIG. 9, the information 903 or the configuration information associated with the set of pre-configured MGPs in the information 903 may further include information associated with one or more default pre-configured MGPs. For example, such information associated with a default pre-configured MGP may be an index of one or more (for example, in a case of supporting concurrent MGPs activation for one BWP) pre-configured MGPs defined in the configuration information associated with the set of pre-configured MGPs in the information 903. In another example, such information associated with a default pre-configured MGP may include indexes of a set of pre-configured values of one or more MGP parameters defined in the configuration information associated with the set of pre-configured MGPs in the information 903.

For example, as illustrated in FIG. 9, the information 903 may be carried via at least one downlink RRC signaling from the network 902 to the UE 901, for example at least one downlink RRC reconfiguration message from the network 902 to the UE 901.

Further, as illustrated in FIG. 9, the UE 901 may receive, for the network 902, information 904 including an indication of a specified BWP and an indication (for example, a flag using one or more bits) of a default MGP configuration or a previous MGP configuration. In another example, the information 904 may include an indication of a specified BWP and an indication (for example using one or more bits) of whether to apply the at least one default MGP configuration to the specified BWP.

In the example as illustrated in FIG. 9, the information 904 is carried in DCI, for example DCI for BWP switch. For example, DCI format size may be extended to carry the indication of the default MGP configuration or the previous MGP configuration. In another example, the information 904 may also be carried via at least one RRC signaling, for example at least one RRC signaling for BWP switch.

Then, as illustrated in FIG. 9, when receiving the information 904, the UE 901 may perform an operation 905 to configure MGPs for the BWP specified in the information 904 based on at least one of the information 903 and the information 904.

For example, in the operation 905, the UE 901 may make or keep the BWP specified in the information 904 to be the active BWP. Then, if the indication in the information 904 indicates to use the default MGP configuration, the UE 901 may determine one or more default pre-configured MGPs based on the information 903, and may activate or apply the one or more determined default pre-configured MGPs for the active BWP.

If the BWP specified in the information 904 is different from the current active BWP and the indication in the information 904 indicates to use the previous MGP configuration, the UE 901 may switch the active BWP to be the BWP specified in the information 904, and may apply one or more activated MGPs of the old active BWP before switching to the new active BWP after the switching.

Figure 10:
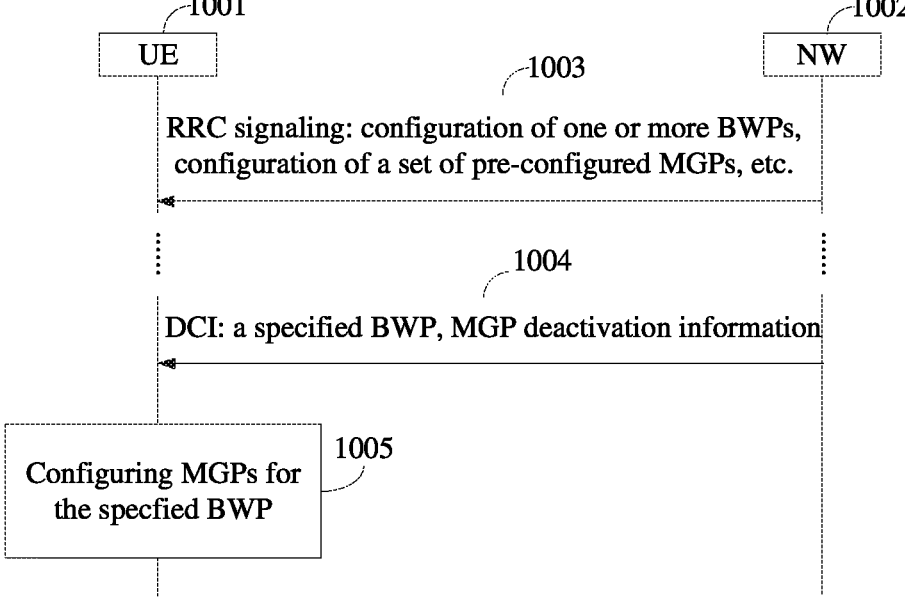
FIG. 10 illustrates an example procedure of configuring MGP in an example embodiment.

FIG. 10 illustrates another example procedure of configuring MGP in an example embodiment.

Similar to the example procedure as illustrated in FIG. 2, FIG. 6, or FIG. 9, in the example procedure as illustrated in FIG. 10, UE 1001 may receive, from network 1002 (for example, a base station or BS associated with a serving cell), information 1003 including configuration information associated with one or more BWPs and configuration information associated with a set of pre-configured MGPs, where the configuration information associated with the set of pre-configured MGPs may include at least one of configuration information in a form for example as illustrated in FIG. 2 to FIG. 5 and configuration information in a form for example as illustrated in FIG. 6 to FIG. 8. Further, the information 1003 or the configuration information associated with the set of pre-configured MGPs in the information 1003 may also include other information such as the information associated with one or more default pre-configured MGPs as illustrated in FIG. 9. For example, the information 1003 does not include information associated with an association between the one or more BWPs and the set of pre-configured MGPs.

For example, as illustrated in FIG. 10, the information 1003 may be carried via at least one downlink RRC signaling from the network 1002 to the UE 1001, for example at least one downlink RRC reconfiguration message from the network 1002 to the UE 1001.

Further, as illustrated in FIG. 10, the UE 1001 may receive, for the network 1002, information 1004 including MGP deactivation information. For example, the MGP deactivation information may include at least one of a predetermined (for example, a special) index value, a predetermined (for example, a special) flag (for example, using one or more bit), an empty index value (for example, a null value), and so on.

In the example as illustrated in FIG. 10, the information 1004 is carried in DCI, for example DCI for BWP switch. For example, DCI format size may be extended to carry the MGP deactivation information. In another example, the information 1004 may also be carried via at least one RRC signaling, for example at least one RRC signaling for BWP switch.

Then, as illustrated in FIG. 10, when receiving the information 1004, the UE 1001 may perform an operation 1005 to configure MGPs for the BWP specified in the information 1004 based on the information 1004, where one or more activated MGPs of the specified BWP may be deactivated according to the indication of the MGP deactivation information. Thus, a fast deactivation of one or more activated MGPs for a BWP may be implemented.

In the above examples, no extra signal is needed when configuring at least one MGP or at least one MGP parameter for a specified BWP, for example in a case of DCI-based BWP switching, so that for example a BWP switch or an adjustment of one or more MGP parameters for an active BWP may be implemented quickly. For example, in the above examples, a delay of completing the BWP switch may include a pre-defined BWP switch time and a MGP application time during which one or more pre-configured MGP is applied or activated to a specified BWP, or one or more activated MGPs for a BWP is deactivated, or values of one or more MGP parameters of one or more activated MGPs for a BWP are adjusted, or the like.

In some examples, one or more MGPs in the set of the pre-configured MGPs may be added, modified or removed.

Figure 11:
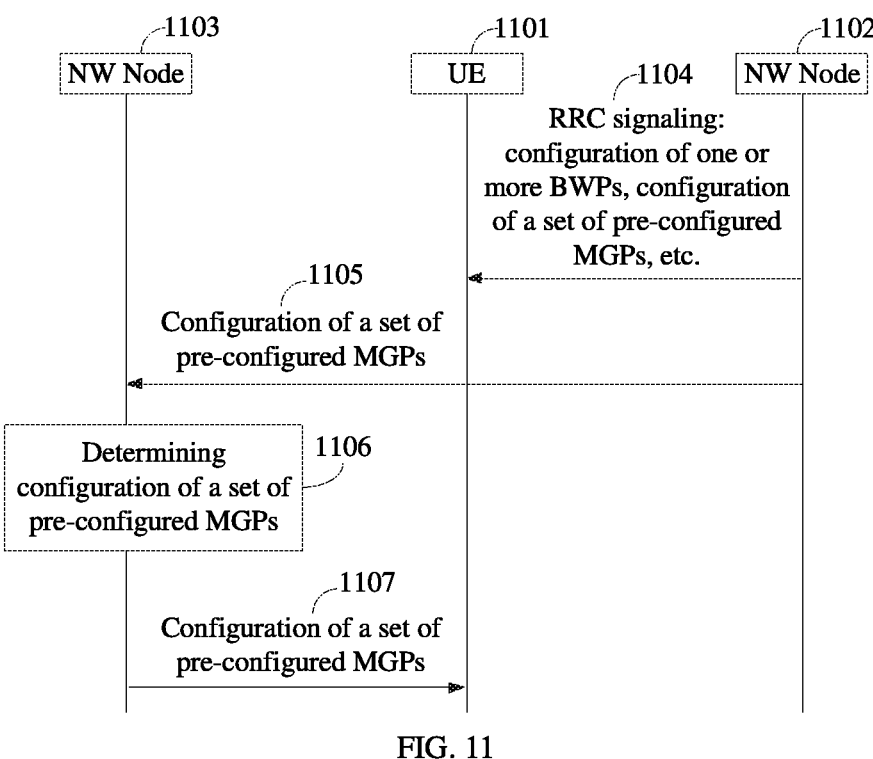
FIG. 11 illustrates an example procedure of configuring MGP in an example embodiment.

For example, as illustrated in FIG. 11, UE 1101 (for example, which may correspond to one or more of the UEs 201, 601, 901, and 1001) may receive information 1104 (for example, which may correspond to one or more of the information 203, 603, 903, and 1003) from a network node 1102 (for example, which may correspond to one or more of the networks 202, 602, 902, and 1002). Then, the network node 1102 may transmit configuration information 1105 associated with a set of pre-configured MGPs in the information 1104 to a network node 1103 (for example, which may correspond to one or more of the networks 202, 602, 902, and 1002), for example via at least one inter-node message.

For example, the network node 1102 may be associated with a serving cell of the UE 1101, and the network node 1103 may be associated with a target cell of the UE 1101. For example, the transmission of the configuration information 1105 may be triggered in a handover (HO) procedure from the source cell to the target cell, and the configuration 1105 may be transmitted from the network node 1102 to the network node 1103 via at least one HO preparation information message.

When receiving the configuration information 1105 from the network node 1102, for example, the network node 1103 may perform an operation 1106 to determine a new configuration information associated with a set of pre-configured MGPs for one or more BWPs of the UE 1101, for example based on the obtained configuration information 1105, and at least one of the requirement or type of the ongoing service, the capability of the UE 1101, and so on.

Then, the network node 1103 may transmit, to the UE 1101, the determined or updated configuration information 1107 associated with possibly an updated set of pre-configured MGPs for one or more BWPs of the UE 1101.

In an example, the configuration information 1107 may include complete configuration information associate with the (possibly updated) set of pre-configured MGPs for one or more BWPs of the UE 1101, which has been determined in the operation 1106. In another example, the configuration information 1107 may include a difference between the configuration information 1105 and the configuration information determined or updated in the operation 1106. In yet another example, the configuration 1107 may include an indication on whether the configuration information 1105 has been modified.

It is appreciated that this disclosure is not limited to the above examples.

Figure 12:
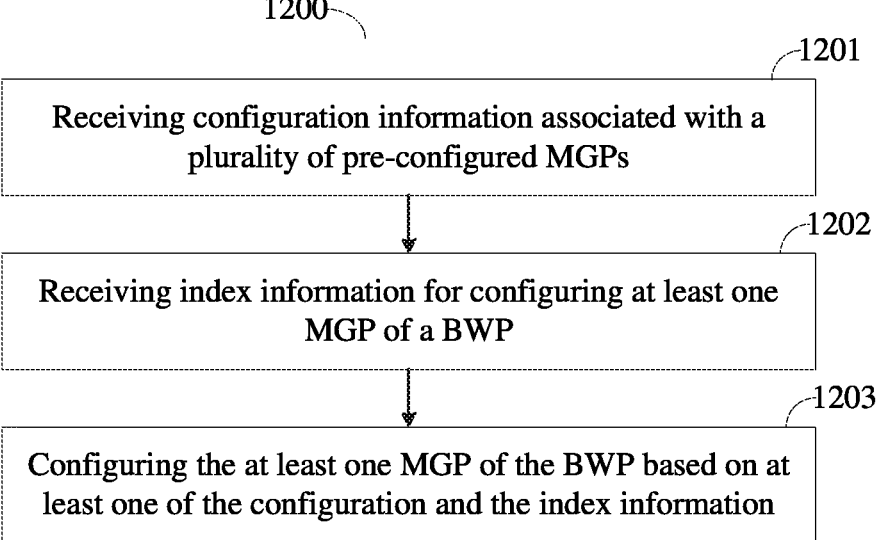
FIG. 12 illustrates an example method for configuring MGP in an example embodiment.

FIG. 12 illustrates an example method 1200 for configuring MGP in an example embodiment, which may be performed for example in a UE such as the UE 201, 601, 901, 1001, 1101 or the like in the above examples.

As illustrated in FIG. 12, the example method 1200 may include an operation 1201, an operation 1202, and an operation 1203.

In the operation 1201, the UE may receive configuration information associated with a plurality of pre-configured MGPs, for example from a network node (for example, NW 202, NW 602, NW 902, NW 1002, NW node 1102, NW node 1103, and so on in the above examples). For example, the plurality of pre-configured measurement gap patterns may be associated with a plurality of bandwidth parts (for example, the whole of the plurality of bandwidth parts). The configuration information received in the operation 1201 may include, but not limited to, the configuration information associated with a plurality of pre-configured MGPs in the information 203, 603, 903, 1003, 1104, or the like in the above examples, or the configuration 1107 in the above example.

In the operation 1202, the UE may further receive index information for configuring at least one MGP of a BWP, for example from the network node. The index information received in the operation 1202 may include, but not limited to, the information 204, 604, 904, 1004, or the like in the above examples.

In the operation 1203, the UE may configure the at least one MGP of the BWP based on at least one of the configuration information received in the operation 1201 and the index information received in the operation 1202. Depending on the index information received in the operation 1202, the configuration performed in the operation 1203 may include at least one of: applying or activating at least one pre-configured MGP for the BWP; applying at least one default pre-configured MGP or at least one previous MGP for the BWP; deactivating at least one MGP for the BWP; modifying a value of at least one MGP parameter applied to the BWP; and so on. Examples of the operation 1203 may include, but not limited to the operation 205, 605, 905, 1005, or the like in the above examples.

In some example embodiments, the configuration information received in the operation 1201 may include a plurality of information items corresponding to the plurality of pre-configured MGPs, where an information item of the plurality of information items may include at least one of: an index; and a parameter configuration associated with a corresponding pre-configured MGP. For example, the index of the corresponding pre-configured MGP may be a predetermined identifier or may depend on an order of the corresponding pre-configured MGP in the plurality of pre-configured MGPs.

In some example embodiments, the configuration information received in the operation 1201 may include a plurality of information items for a MGP parameter among a plurality of MGP parameters associated with the plurality of MGPs, where an information item of the plurality of information items for the MGP parameter may include a value of the MGP parameter and an index corresponding to the value of the MGP parameter.

In some example embodiments, two or more indexes in the configuration information received in the operation 1201 may correspond to a substantially same predetermined identifier.

In some example embodiments, the configuration information received in the operation 1201 may include information (for example, an indication) associated with at least one default pre-configured MGP.

In some example embodiments, the configuration information received in the operation 1201 may be received via at least one downlink RRC signaling, for example at least one downlink RRC reconfiguration signaling.

In some example embodiments, the index information received in the operation 1202 may include at least one index value for the at least one MGP to be applied to the BWP.

In some example embodiments, the index information received in the operation 1202 may include at least one index value associated with at least one MGP parameter among the plurality of MGP parameters.

In some example embodiments, the index information received in the operation 1202 may include at least one of: information for indicating to apply at least one default pre-configured MGP or at least one previous MGP to the BWP; and information for indicating whether to apply the at least one default pre-configured MGP to the BWP.

In some example embodiments, the index information received in the operation 1202 may include at least one predetermined index or at least one empty index for indicating to deactivate at least one activated MGP of the BWP.

In some example embodiments, the index information received in the operation 1202 may be received via DCI or at least one downlink RRC signaling. For example, the index information received in the operation 1202 may be received via DCI or at least one downlink RRC signaling for BWP switch, and a delay of completing the BWP switch may include both a pre-defined BWP switch time and a MGP application time.

In some example embodiments, the example method 1200 may further include an operation of receiving another configuration information associated with another plurality of pre-configured MGPs (for example, the reception of the configuration information 1107 as illustrated in FIG. 11), and an operation of updating the configuration information based on the another configuration information.

Figure 13:
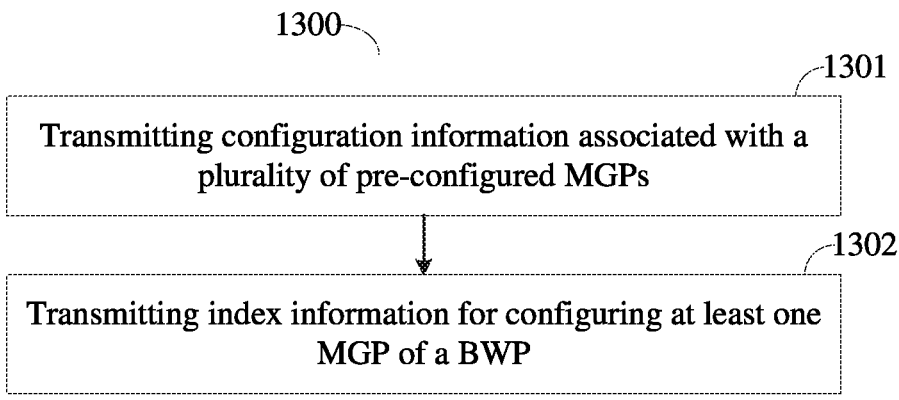
FIG. 13 illustrates an example method for configuring MGP in an example embodiment.

FIG. 13 illustrates an example method 1300 for configuring MGP in an example embodiment, which may be performed for example in a network node such as the network node 202, 602, 902, 1002, 1102, 1103, or the like in the above examples.

As illustrated in FIG. 13, the example method 1300 may include an operation 1301 and an operation 1302.

In the operation 1301, the network node may transmit, to a UE, configuration information associated with a plurality of pre-configured MGPs. For example, the plurality of pre-configured measurement gap patterns may be associated with a plurality of bandwidth parts (for example, the whole of the plurality of bandwidth parts). The configuration information transmitted in the operation 1301 may include, but not limited to, the configuration information associated with a plurality of pre-configured MGPs in the information 203, 603, 903, 1003, 1104, or the like in the above examples, or the configuration 1107 in the above example.

In the operation 1302, the network node may further transmit, to the UE, index information for configuring at least one MGP of a BWP. The index information transmitted in the operation 1302 may include, but not limited to, the information 204, 604, 904, 1004, or the like in the above examples.

In some example embodiments, the configuration information transmitted in the operation 1301 may include a plurality of information items corresponding to the plurality of pre-configured MGPs, where an information item of the plurality of information items may include at least one of: an index; and a parameter configuration associated with a corresponding pre-configured MGP. For example, the index of the corresponding pre-configured MGP may be a predetermined identifier or may depend on an order of the corresponding pre-configured MGP in the plurality of pre-configured MGPs.

In some example embodiments, the configuration information transmitted in the operation 1301 may include a plurality of information items for a MGP parameter among a plurality of MGP parameters associated with the plurality of MGPs, where an information item of the plurality of information items for the MGP parameter may include a value of the MGP parameter and an index corresponding to the value of the MGP parameter.

In some example embodiments, two or more indexes in the configuration information transmitted in the operation 1301 may correspond to a substantially same predetermined identifier.

In some example embodiments, the configuration information transmitted in the operation 1301 may include information (for example, an indication) associated with at least one default pre-configured MGP.

In some example embodiments, the configuration information transmitted in the operation 1301 may be determined based on at least one of: capability of a UE; requirement of at least one service; and so on.

In some example embodiments, the configuration information transmitted in the operation 1301 may be transmitted via at least one downlink RRC signaling, for example at least one downlink RRC reconfiguration signaling.

In some example embodiments, the index information transmitted in the operation 1302 may include at least one index value for the at least one MGP to be applied to the BWP.

In some example embodiments, the index information transmitted in the operation 1302 may include at least one index value associated with at least one MGP parameter among the plurality of MGP parameters.

In some example embodiments, the index information transmitted in the operation 1302 may include at least one of: information for indicating to apply at least one default pre-configured MGP or at least one previous MGP to the BWP; and information for indicating whether to apply the at least one default pre-configured MGP to the BWP.

In some example embodiments, the index information transmitted in the operation 1302 may include at least one predetermined index or at least one empty index for indicating to deactivate at least one activated MGP of the BWP.

In some example embodiments, the index information transmitted in the operation 1302 may be determined based on at least one of: capability of the UE; requirement of at least one ongoing service; and so on.

In some example embodiments, the index information transmitted in the operation 1302 may be transmitted via DCI or at least one downlink RRC signaling. For example, the index information transmitted in the operation 1302 may be transmitted via DCI or at least one downlink RRC signaling for BWP switch, and a delay of completing the BWP switch may include both a pre-defined BWP switch time and a MGP application time.

In some example embodiments, the example method 1300 may further include an operation of receiving another configuration information associated with another plurality of pre-configured MGPs, an example of which may include, but not limited to, the reception of the configuration information 1105 by the network node 1103 from the network node 1102 in the above examples. Further, the example 1300 may also include an operation of determining the configuration information to be transmitted in the operation 1301 based on at least one of the another received configuration information, capability of the UE, requirement of at least one service, and so on, an example of which may include, but not limited to, the operation 1106 in the above examples.

In some example embodiments, for example if the example method 1300 is performed in a network node such as the network node 1102 in FIG. 11, the example method 1300 may further include an operation of transmitting the configuration information to another network node, for example via at least one inter-node message.

Figure 14:
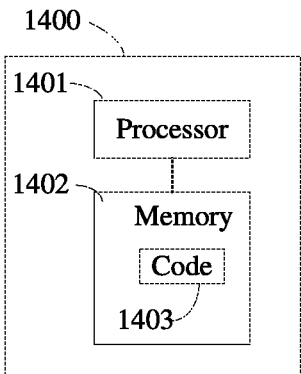
FIG. 14 illustrates an example apparatus for configuring MGP in an example embodiment.

FIG. 14 illustrates an example apparatus 1400 for configuring MGP in an example embodiment, which may be at least a part of a UE such as such as the UE 201, 601, 901, 1001, 1101 or the like in the above examples.

As shown in FIG. 14, the example apparatus 1400 may include at least one processor 1401 and at least one memory 1402 that may include computer program code 1403, where the at least one memory 1402 and the computer program code 1403 may be configured to, with the at least one processor 1401, cause the apparatus 1400 at least to perform at least the operations of the example method 1200 described above.

In various example embodiments, the at least one processor 1401 in the example apparatus 1400 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 1401 may also include at least one other circuitry or element not shown in FIG. 14.

In various example embodiments, the at least one memory 1402 in the example apparatus 1400 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 1402 may include, but are not limited to, an electric, a magnetic, an optical, an electromagnetic, an infrared, or a semiconductor system, apparatus, or device or any combination of the above.

Further, in various example embodiments, the example apparatus 1400 may also include at least one other circuitry, element, and interface, for example at least one I/O interface, at least one antenna element, and the like.

In various example embodiments, the circuitries, parts, elements, and interfaces in the example apparatus 1400, including the at least one processor 1401 and the at least one memory 1402, may be coupled together via any suitable connections including, but not limited to, buses, crossbars, wiring and/or wireless lines, in any suitable ways, for example electrically, magnetically, optically, electromagnetically, and the like.

It is appreciated that implementations in the UE for configuring MGP are not limited to the example apparatus 1400. In another example embodiments, an example implementation in the UE for configuring MGP may include means for performing operations in the example method 1200, including means for performing the operation 1201, means for performing the operation 1202, and means for performing the operation 1203.

In some example embodiments, examples of means may also include circuitries, software modules and any other suitable function entities. The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to one or all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

Figure 15:
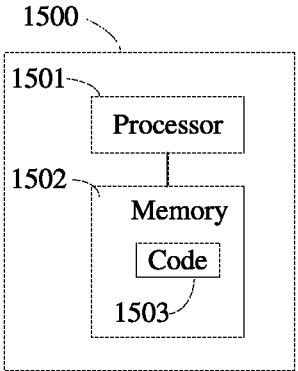
FIG. 15 illustrates an example apparatus for configuring MGP in an example embodiment.

FIG. 15 illustrates an example apparatus 1500 for configuring MGP in an example embodiment, which may be at least a part of a network node such as such as the network node 202, 602, 902, 1002, 1102, 1103, or the like in the above examples.

As shown in FIG. 15, the example apparatus 1500 may include at least one processor 1501 and at least one memory 1502 that may include computer program code 1503, where the at least one memory 1502 and the computer program code 1503 may be configured to, with the at least one processor 1501, cause the apparatus 1500 at least to perform at least the operations of the example method 1300 described above.

In various example embodiments, the at least one processor 1501 in the example apparatus 1500 may include, but not limited to, at least one hardware processor, including at least one microprocessor such as a CPU, a portion of at least one hardware processor, and any other suitable dedicated processor such as those developed based on for example FPGA and ASIC. Further, the at least one processor 1501 may also include at least one other circuitry or element not shown in FIG. 15.

In various example embodiments, the at least one memory 1502 in the example apparatus 1500 may include at least one storage medium in various forms, such as a volatile memory and/or a non-volatile memory. The volatile memory may include, but not limited to, for example, a RAM, a cache, and so on. The non-volatile memory may include, but not limited to, for example, a ROM, a hard disk, a flash memory, and so on. Further, the at least memory 1502 may include, but are not limited to, an electric, a magnetic, an optical, an electromagnetic, an infrared, or a semiconductor system, apparatus, or device or any combination of the above.

Further, in various example embodiments, the example apparatus 1500 may also include at least one other circuitry, element, and interface, for example at least one I/O interface, at least one antenna element, and the like.

In various example embodiments, the circuitries, parts, elements, and interfaces in the example apparatus 1500, including the at least one processor 1501 and the at least one memory 1502, may be coupled together via any suitable connections including, but not limited to, buses, crossbars, wiring and/or wireless lines, in any suitable ways, for example electrically, magnetically, optically, electromagnetically, and the like.

It is appreciated that implementations in the network node for configuring MGP are not limited to the example apparatus 1500. In another example embodiments, an example implementation in the network node for configuring MGP may include means for performing operations in the example method 1300, including means for performing the operation 1301 and means for performing the operation 1302. In some example embodiments, examples of means may also include circuitries, software modules and any other suitable function entities.

Further, one or more example embodiments may also be applied to a scenario of a device-to-device (D2D) case. Then, the networks or network nodes as illustrated in FIG. 1 to FIG. 15 may also include one or more UEs acting as one or more control node.

Another example embodiment may relate to computer program codes or instructions which may cause an apparatus to perform at least respective methods described above. Another example embodiment may be related to a computer readable medium having such computer program codes or instructions stored thereon. In some embodiments, such a computer readable medium may include at least one storage medium in various forms such as a volatile memory and/or a non-volatile memory. The volatile memory may include, but not limited to, for example, a RAM, a cache, and so on. The non-volatile memory may include, but not limited to, a ROM, a hard disk, a flash memory, and so on. The non-volatile memory may also include, but are not limited to, an electric, a magnetic, an optical, an electromagnetic, an infrared, or a semiconductor system, apparatus, or device or any combination of the above.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While some embodiments have been described, these embodiments have been presented by way of example, and are not intended to limit the scope of the disclosure. Indeed, the apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. At least one of these blocks may be implemented in a variety of different ways. The order of these blocks may also be changed. Any suitable combination of the elements and acts of the some embodiments described above can be combined to provide further embodiments. The accompanying claims and their equivalents are intended to cover such forms or modifications as would fall within the scope and spirit of the disclosure.

What is claimed is:

1. An apparatus comprising at least one processor; and
at least one memory including computer program code, the at least one memory and the computer program code being configured to, with the at least one processor, cause the apparatus to perform:
receiving, from a network node, configuration information associated with a plurality of pre-configured measurement gap patterns;
receiving, from the network node and for a bandwidth part, index information for configuring at least one measurement gap pattern of the bandwidth part;
configuring the at least one measurement gap pattern of the bandwidth part based on at least one of the configuration information and the index information;
wherein said configuring the at least one measurement gap pattern of the bandwidth part based on at least one of the configuration information and the index information includes, depending on the index information, activating at least one pre-configured measurement gap pattern of the plurality of pre-configured measurement gap patterns and deactivating at least one activated measurement gap pattern for the bandwidth part; and
wherein the index information comprises at least one empty index for indicating to deactivate the at least one activated measurement gap pattern of the bandwidth part.

2. The apparatus of claim 1, wherein the configuration information comprises a plurality of information items corresponding to the plurality of pre-configured measurement gap patterns, an information item of the plurality of information items comprising at least one of an index and a parameter configuration associated with a corresponding pre-configured measurement gap pattern, and wherein the index information comprises at least one index value for the at least one pre-configured measurement gap pattern to be applied to the bandwidth part.

3. The apparatus of claim 2, wherein the index of the corresponding pre-configured measurement gap pattern is a predetermined identifier or depends on an order of the corresponding pre-configured measurement gap pattern in the plurality of pre-configured measurement gap patterns.

4. The apparatus of claim 2, wherein two or more indexes in the configuration information correspond to a same predetermined identifier.

5. The apparatus of claim 1, wherein the configuration information comprises a plurality of information items for a measurement gap pattern parameter among a plurality of measurement gap pattern parameters associated with the plurality of measurement gap patterns, an information item of the plurality of information items for the measurement gap pattern parameter comprising a value of the measurement gap pattern parameter and an index corresponding to the value of the measurement gap pattern parameter.

6. The apparatus of claim 5, wherein the index information comprises at least one index value associated with at least one measurement gap pattern parameter among the plurality of measurement gap pattern parameters.

7. The apparatus of claim 1, wherein the configuration information comprises an indication of at least one default pre-configured measurement gap pattern.

8. The apparatus of claim 7, wherein the index information comprises at least one of:

information for indicating to apply the at least one default pre-configured measurement gap pattern or at least one previous measurement gap pattern to the bandwidth part; and information for indicating whether to apply the at least one default pre-configured measurement gap pattern to the bandwidth part.

9. The apparatus of claim 1, wherein the index information comprises at least one predetermined index or at least one empty index for indicating to deactivate at least one activated measurement gap pattern of the bandwidth part.

10. The apparatus of claim 1, wherein the apparatus is configured to receive the configuration information via at least one first downlink radio resource control signaling.

11. The apparatus of claim 1, wherein the apparatus is configured to receive the index information via downlink control information or at least one second downlink radio resource control signaling.

12. The apparatus of claim 11, wherein the apparatus is configured to receive the index information via downlink control information or at least one second downlink radio resource control signaling for a bandwidth part switch, a delay of completing the bandwidth part switch including both a pre-defined bandwidth part switch time and a measurement gap pattern application time.

13. The apparatus of claim 1, wherein the apparatus is caused to perform:

receiving another configuration information associated with another plurality of pre-configured measurement gap patterns; and updating the configuration information based on the another configuration information.

14. The apparatus of claim 1, wherein the plurality of pre-configured measurement gap patterns are associated with a plurality of bandwidth parts.

15. The apparatus of claim 1, wherein the at least one empty index is at least one null value.

16. The apparatus of claim 15, wherein the index information comprises at least one index value for the at least one measurement gap pattern to be applied to the bandwidth part.

17. The apparatus of claim 1, wherein the index information is received for activating two or more pre-configured measurement gap patterns of the bandwidth part, wherein the two or more preconfigured measurement gap patterns are of the plurality of pre-configured measurement gap patterns, and wherein said activating at least one pre-configured measurement gap pattern of the plurality of pre-configured measurement gap patterns comprises activating the two or more pre-configured measurement gap pattern of the bandwidth part based on at least the index information.

18. An apparatus comprising at least one processor; and at least one memory including computer program code, the at least one memory and the computer program code being configured to, with the at least one processor, cause the apparatus to perform:

transmitting, to a user equipment, configuration information associated with a plurality of pre-configured measurement gap patterns; and transmitting, to the user equipment and for a bandwidth part, index information for configuring at least one measurement gap pattern of the bandwidth part, wherein said configuring the at least one measurement gap pattern of the bandwidth part based on at least one of the configuration information and the index information includes, depending on the index information, activating at least one pre-configured measurement gap pattern of the plurality of pre-configured measurement gap patterns and deactivating at least one activated measurement gap pattern for the bandwidth part, and wherein the index information comprises at least one empty index for indicating to deactivate the at least one activated measurement gap pattern of the bandwidth part.

19. The apparatus of claim 18, wherein the configuration information comprises a plurality of information items corresponding to the plurality of pre-configured measurement gap patterns, an information item of the plurality of information items comprising at least one of an index and a parameter configuration associated with a corresponding pre-configured measurement gap pattern, and wherein the index information comprises at least one index value for the at least one pre-configured measurement gap pattern to be applied to the bandwidth part.

20. The apparatus of claim 18, wherein the at least one empty index is at least one null value.

21. The apparatus of claim 18, wherein the index information is transmitted for activating two or more pre-configured measurement gap patterns of the bandwidth part, wherein the two or more pre-configured measurement gap patterns are of the plurality of pre-configured measurement gap patterns, and wherein said activating at least one pre-configured measurement gap pattern of the plurality of pre-configured measurement gap patterns comprises activating the two or more pre-configured measurement gap pattern of the bandwidth part based on at least the index information.

* * * * *